United States Patent
Terada et al.

(10) Patent No.: US 6,261,990 B1
(45) Date of Patent: Jul. 17, 2001

(54) COMPOSITE CATALYST FOR PURIFICATION OF EXHAUST GAS

(75) Inventors: Kazuhide Terada; Ken Ogawa; Takeshi Narishige; Tomomi Sugiyama; Naohiro Satou, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/198,497

(22) Filed: Nov. 24, 1998

(30) Foreign Application Priority Data

Dec. 9, 1997 (JP) .................................................. 9-338733

(51) Int. Cl.$^7$ ............................. B01J 23/00; B01J 23/40; B01J 23/42; B32B 9/00; B32B 15/04

(52) U.S. Cl. ......................... 502/325; 502/303; 502/326; 502/525; 502/527.12; 502/527.15; 502/527.16; 502/527.17; 502/527.19; 428/469; 428/472

(58) Field of Search ................... 428/469, 472; 502/325, 525, 527.12, 527.15, 527.16, 527.17, 527.19, 303, 326

(56) References Cited

U.S. PATENT DOCUMENTS

| | | | |
|---|---|---|---|
| 3,884,837 | * 5/1975 | Remeika et al. | 502/303 |
| 3,900,428 | * 8/1975 | Mai et al. | 502/525 |
| 3,905,918 | 9/1975 | Mai et al. | 252/462 |
| 4,126,580 | * 11/1978 | Lauder | 502/303 |
| 4,134,852 | * 1/1979 | Volin | 502/349 |
| 4,140,655 | 2/1979 | Chabot et al. | 252/462 |
| 4,151,123 | 4/1979 | McCann, III | 252/462 |
| 4,426,319 | * 1/1984 | Blanchard et al. | 502/241 |
| 4,426,320 | * 1/1984 | Ernest et al. | 502/313 |
| 4,710,487 | * 12/1987 | Koch | 502/303 |
| 4,812,300 | * 3/1989 | Quinlan et al. | 423/404 |
| 4,849,398 | * 7/1989 | Takada et al. | 502/303 |
| 4,861,802 | * 8/1989 | McCann | 518/717 |
| 4,868,148 | * 9/1989 | Henk et al. | 502/303 |
| 4,923,842 | * 5/1990 | Summers | 502/261 |
| 5,149,516 | * 9/1992 | Han et al. | 423/418.2 |
| 5,185,311 | * 2/1993 | Tabata et al. | 502/525 |
| 5,326,735 | 7/1994 | Itoh et al. | 502/177 |
| 5,439,865 | * 8/1995 | Abe et al. | 502/333 |
| 5,487,268 | 1/1996 | Itoh et al. | 60/274 |
| 5,559,073 | * 9/1996 | Hu et al. | 502/302 |
| 5,628,975 | * 5/1997 | Horiuchi et al. | 423/213.2 |
| 5,691,263 | * 11/1997 | Park et al. | 502/66 |

FOREIGN PATENT DOCUMENTS

| | | |
|---|---|---|
| 0513413A1 | 11/1992 | (EP) . |
| 0577879A1 | 1/1994 | (EP) . |
| 5-38420 | 2/1993 | (JP) . |
| 6-31173 | 2/1994 | (JP) . |
| 8-1006 | 1/1996 | (JP) . |
| 2598717 | 1/1997 | (JP) . |
| WO 90/08589 | 8/1990 | (WO) . |

* cited by examiner

Primary Examiner—Mark L. Bell
Assistant Examiner—Patricia L. Hailey
(74) Attorney, Agent, or Firm—Arent Fox Kintner Plotkin & Kahn, PLLC

(57) ABSTRACT

A composite catalyst includes a first catalyst part containing an Ir catalyst and a second catalyst part covering the first catalyst part and containing a perovskite type composite oxide. The perovskite type composite oxide contributes mainly to oxidation reaction such as $NO+O_2 \rightarrow NO_2$ in an atmosphere of excess oxygen while the Ir catalyst contributes mainly to reduction reaction with HC (hydrocarbon) as a reducing agent such as $NO_2+HC+O_2 \rightarrow N_2+CO_2+H_2O$.

2 Claims, 2 Drawing Sheets

COMPOSITE CATALYST FOR PURIFICATION OF EXHAUST GAS

BACKGROUND OF THE INVENTION

The present invention relates to a composite catalyst for the purification of exhaust gas.

As a catalyst for the purification of exhaust gas, particularly NOx (nitrogen oxide), there has heretofore been known an Ir (iridium) catalyst (see U.S. Pat. No. 5,326,735 and U.S. Pat. No. 5,487,268).

The conventional Ir catalyst exhibits a relatively high capacity of purifying NOx in an atmosphere of excess oxygen but is disadvantageous in that it has a low durability.

SUMMARY OF THE INVENTION

An object of the present invention is to provide a composite catalyst for the purification of exhaust gas which exhibits a high capacity of purifying NOx and an excellent durability in an atmosphere of excess oxygen.

In order to accomplish the foregoing object, the present invention provides a composite catalyst for the purification of exhaust gas comprising a first catalyst part containing an Ir catalyst and a second catalyst part covering the first catalyst part and containing a perovskite type composite oxide.

In the foregoing arrangement, the perovskite type composite oxide in the second catalyst part contributes mainly to oxidation reaction such as $NO+O_2 \rightarrow NO_2$ in an atmosphere of excess oxygen while the Ir catalyst in the first catalyst part contributes mainly to reduction reaction with HC (hydrocarbons including saturated or unsaturated hydrocarbons) as a reducing agent such as $NO_2+HC+O_2 \rightarrow N_2+CO_2+H_2O$ (typical equation) in an atmosphere of excess oxygen. In other words, the use of perovskite type composite oxide allows $NO_2$ to be positively supplied into the Ir catalyst and the Ir catalyst to efficiently reduce $NO_2$ to $N_2$. Thus, the composite catalyst exhibits a high capacity of purifying NOx in an atmosphere of excess oxygen.

On the other hand, when the Ir catalyst is directly exposed to an atmosphere of excess oxygen at elevated temperatures, Ir becomes an oxide which can be easily vaporized. This causes deterioration of the durability of the Ir catalyst. In order to overcome these difficulties, the first catalyst part having an Ir catalyst is covered by a second catalyst part. This second catalyst part inhibits evaporation of the Ir oxide, making it possible to drastically enhance the durability of the Ir catalyst.

DETAILED DESCRIPTION OF THE PREFERRED EMBODIMENTS

Figure 1:
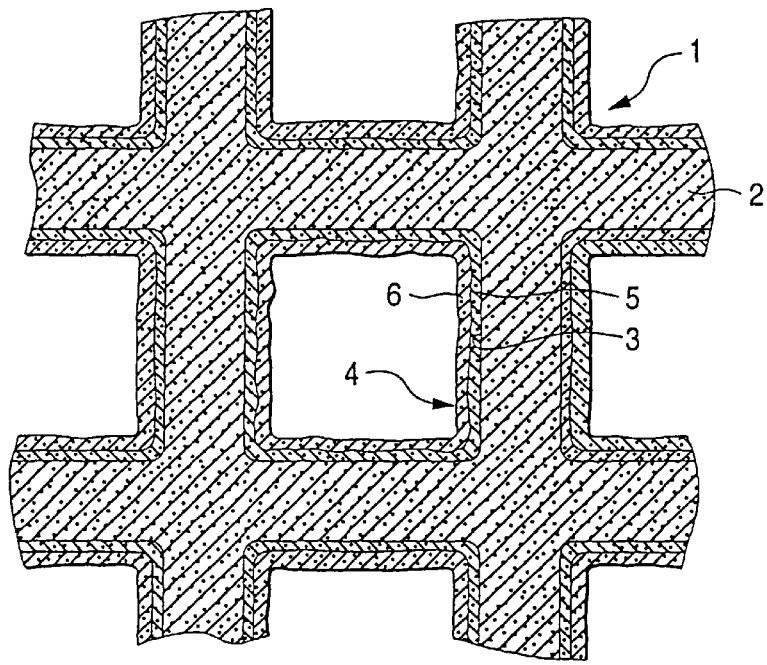
FIG. 1 is a sectional view of an essential part of a purifier having a composite catalyst.

An embodiment of an exhaust gas purifier 1 shown in FIG. 1 comprises a heat-resistant honeycomb 2 and a composite catalyst 4 retained on the inner surface of cells 3 and having a laminated structure. The honeycomb 2 is made of cordierite and has 400 cells/in$^2$, 6 mil and a volume of 1.21.

The composite catalyst 4 comprises a first layered catalyst part 5 adhered closely to the inner surface of the cells 3 and containing an Ir catalyst and a second layered catalyst part 6 covering the first catalyst part 5 and containing a perovskite type composite oxide.

The Ir catalyst comprises Ir supported on, e.g., SiC (silicon carbide) whisker powder in an amount of 1.5 wt-%. The first catalyst part 5 is a sintered product of Ir supported on SiC whisker powder and silica as a binder. Sintering of the mixture was effected in an atmosphere of inert gas such as $N_2$ gas to prevent oxidation of Ir. The content of the Ir supported on SiC whisker powder in the first catalyst part 5 was 94 wt-%, and the amount of the first catalyst part 5 retained in the honeycomb 2 was 80 g/l.

As the perovskite type composite oxide there is used one containing La atom and Co atom such as $LaCoO_3$. The second catalyst part 6 is a sintered product of $LaCoO_3$ powder and silica as a binder. Sintering of the mixture was effected in an atmosphere of $N_2$ gas similarly to the first catalyst part 5 to prevent oxidation of Ir because it is effected after the sintering of the first catalyst part 5. The content of the $LaCoO_3$ powder in the second catalyst part 6 was 90 wt-%, and the amount of the second catalyst part 6 retained in the honeycomb 2 was 10 g/l.

Figure 2:
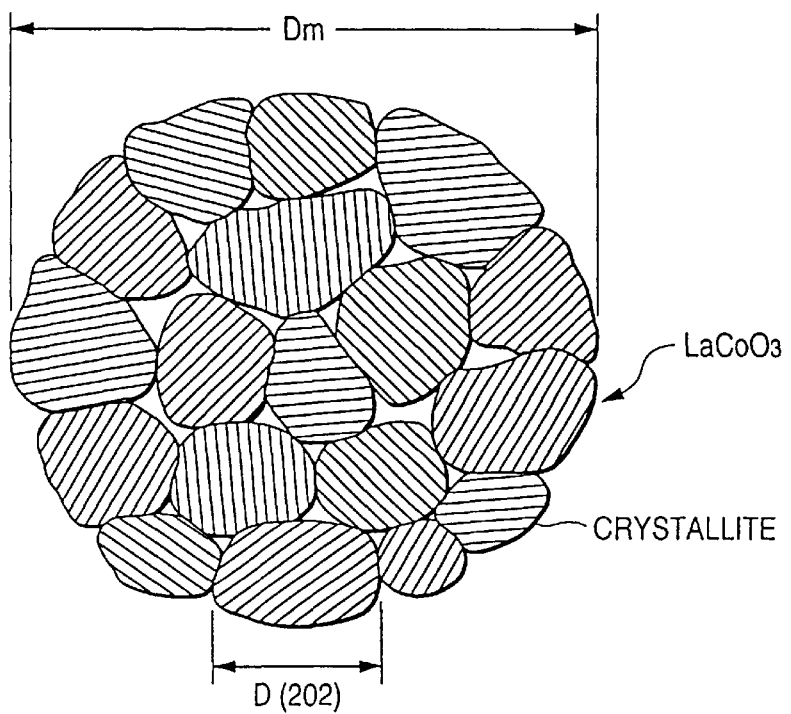
FIG. 2 is a diagram illustrating $LaCoO_3$.

$LaCoO_3$ is a polycrystalline particulate material having a plurality of crystallites aggregated therein as shown in FIG. 2. Table 1 shows the results of various measurements on $LaCoO_3$.

TABLE 1

| $LaCoO_3$ | |
| --- | --- |
| Crystallite diameter $D_{(202)}$ | 56 nm |
| Average pore radius | 6.04 nm |
| Total pore volume | 0.0357 ml/g |
| Specific surface area | 11.82 m$^2$/g |
| Average median diameter Dm | 9,080 nm |

In Table 1, the calculation of crystallite diameter $D_{(hkl)}$ was carried out using Schler's equation, i.e., $D_{(hkl)}=0.94 \lambda/(\beta_{1/2} \cdot \cos \theta)$ wherein hkl represents Miller indices, $\lambda$ represents the wavelength (A) of characteristic X-ray, $\beta_{1/2}$ represents the half-width (radian) of (hkl) plane, and $\theta$ represents the angle of reflection of X-ray. For $LaCoO_3$, the crystallite diameter $D_{(202)}$ was calculated from the diffraction intensity of (202) plane on X-ray diffraction pattern.

The average pore radius, total pore volume and specific surface area (BET multiple points) were determined by gas absorption method. The average median diameter Dm was determined by laser diffraction/scattering particle size distribution method.

For comparison, a comparative example of purifier comprising a first catalyst part similar to that mentioned above retained in a honeycomb similar to that mentioned above was prepared. That is, the comparative example does not include the second catalyst part containing a perovskite type composite oxide.

In order to confirm the effect of $LaCoO_3$ as an oxidation catalyst, a reference example of purifier comprising a sintered product layer of $LaCoO_3$ powder and silica as a binder retained in a honeycomb was prepared. That is, the reference example does not include the first catalyst part containing an Ir catalyst, and the second catalyst part is adhered the inner surface of the cells 3. As the honeycomb there was used one made of cordierite having 400 cells/in$^2$, 6 mil and a volume of 30 ml. In this case, the content of $LaCoO_3$ powder in the sintered product layer was 90 wt-%, and the amount of the sintered product layer retained in the honeycomb was 130 g/l.

A. The reference example of purifier was subjected to the following test to measure the conversion percentage of NO to $NO_2$, i.e., $NO_2$ conversion percentage.

Table 2 shows the composition of the gas to be examined.

TABLE 2

| Gas to be examined | |
|---|---|
| NO | 130 ppm |
| $O_2$ | 7.4 vol-% |
| $H_2O$ | 10 vol-% |
| $N_2$ | Balance |

Figure 3:
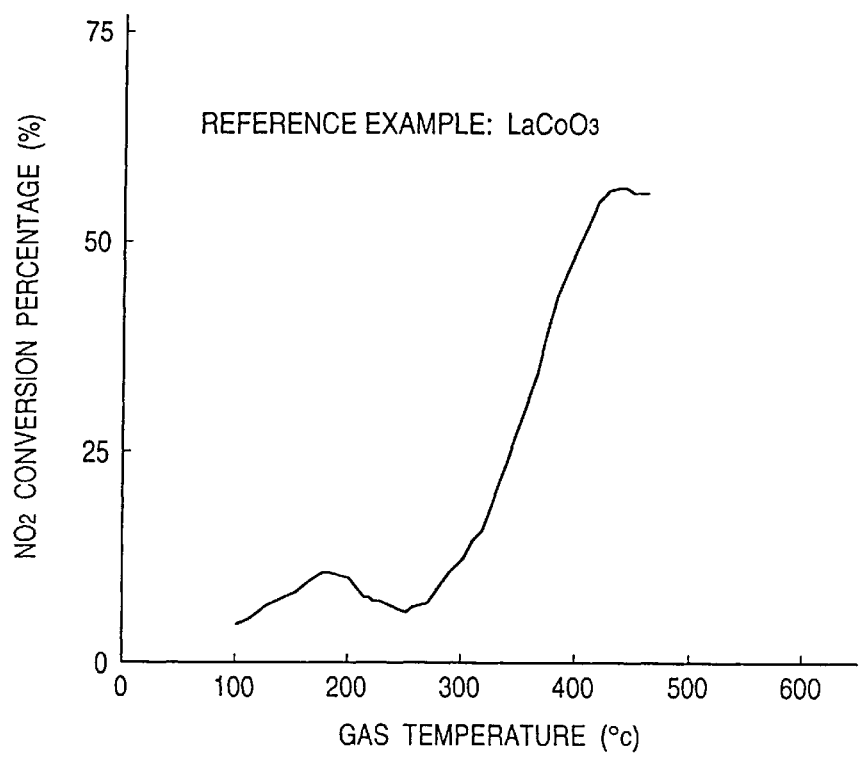
FIG. 3 is a graph illustrating the relationship between gas temperature and $NO_2$ conversion percentage.

The reference example of purifier was mounted in a fixed bed flow process reactor. The gas to be examined having the composition set forth in Table 2 was then allowed to flow through the reactor at a space velocity S.V. of $3.5 \times 10^4$ h$^{-1}$ while being heated at a rate of 20° C./min. from ordinary temperature. Under these conditions, $NO_2$ conversion percentage was measured. The results are set forth in FIG. 3. In FIG. 3, the gas temperature is the temperature of the gas inlet of the purifier. FIG. 3 shows that $LaCoO_3$ allows active conversion percentage of NO to $NO_2$ when the gas temperature goes beyond 300° C., i.e., reaches the temperature range where the first catalyst part containing an Ir catalyst exhibits a high purifying capacity.

B. The embodiment and the comparative example of purifier were subjected to the following NOx purifying test.

The comparative example of purifier was mounted in the exhaust system of a 2000 cc lean burn engine. The engine was then operated in such a manner that the temperature of the gas inlet of the purifier reached 380° C. in a lean atmosphere (Air Fuel Ratio: A/F=21). Under these conditions, the NOx purification percentage was measured at an aging time of 0.

Subsequently, the engine was operated for a predetermined period of time in such a manner that the temperature of the purifier reached 750° C. in a lean atmosphere (A/F= 19). Thus, the composite catalyst was aged. Accordingly, this operating time is aging time.

Thereafter, the operation of the engine was suspended. Subsequently, the operation of the engine was resumed in the same manner as in the foregoing measurement of NOx purification percentage. The aging was prolonged. The NOx purification percentage was measured at each aging time.

The comparative example of purifier was subjected to measurement of NOx purification percentage and aging.

Table 3 shows the results of the NOx purification percentage vs. aging time on the embodiment and the comparative example.

TABLE 3

| | | Aging time (h) | | | | |
|---|---|---|---|---|---|---|
| | | 0 | 9 | 33 | 46 | 100 |
| Embodiment | Nox purification percentage | 50.8 | 55.9 | 56.4 | 68.7 | 49.0 |
| | | 0 | 9 | 33 | 65 | 100 |
| Comparative Example | NOx purification percentage | 60.0 | 56.9 | 33.8 | 51.3 | 34.6 |

Figure 4:
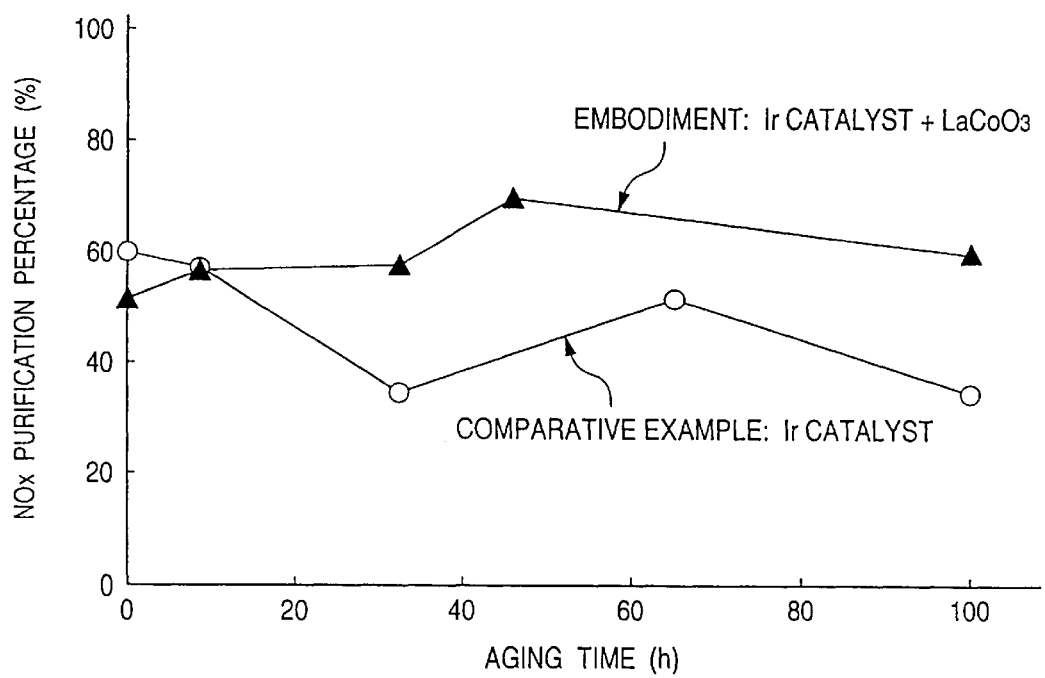
FIG. 4 is a graph illustrating the relationship between aging time and NOx purification percentage.

FIG. 4 graphically illustrates the relationship between aging and NOx purification percentage based on Table 3. It can be seen in FIG. 4 that the embodiment is somewhat inferior to the comparative example in capacity of purifying NOx between before aging and the initial stage of aging. However, the superiority of the embodiment and the comparative example was then reversed as the aging proceeded. In other words, the difference in capacity of purifying NOx between the embodiment and the comparative example increased. This phenomenon makes obvious the effect of covering the first catalyst part 5 having an Ir catalyst by the second catalyst part 6 containing $LaCoCo_3$.

The formation of the foregoing second catalyst part 6 was carried out by the following method.

(1) 150 g of $LaCoO_3$, 85 g of 20% silica sol and 650 g of ion-exchanged water were charged in a resin pot with alumina balls, and then wet-ground for 2 hours to prepare a slurried matter.

(2) To the slurried matter was then added 6,000 g of ion-exchanged water. The mixture was then thoroughly stirred to obtain a mixed solution.

(3) A honeycomb 2 having a first catalyst part 5 was dipped in the mixed solution, withdrawn from the mixed solution, and then blown with air to remove excess solution.

(4) The honeycomb 2 was then held in the atmosphere at a temperature of 150° C. for 2 hours so that the mixed solution was dried to obtain a solid matter.

(5) The foregoing steps (3) and (4) were then repeated three times.

(6) The honeycomb 2 having a solid matter held therein was then sintered at a temperature of 400° C. in an $N_2$ atmosphere for 12 hours to obtain a second catalyst part 6.

The composite catalyst of the present invention may be a granular material comprising a round first catalyst part as a core and a second catalyst part as a shell. As the perovskite type composite oxide there may be used $LaCrO_3$, $LaMnO_3$, $LaFeO_3$, $BaTiO_3$ or the like as well.

In accordance with the present invention, the foregoing arrangement makes it possible to provide a composite catalyst for the purification of exhaust gas which exhibits a high capacity of purifying NOx and an excellent durability in an atmosphere of excess oxygen.

What is claimed is:

1. A composite catalyst for purification of exhaust gas comprising:

a first catalyst part containing an Ir catalyst; and a second catalyst part covering said first catalyst part and comprising a perovskite type composite oxide, wherein said perovskite type composite oxide comprises $LaCoO_3$.

2. A purifier for purifying exhaust gas comprising:

a honeycomb having a plurality of cells;

a first layered catalyst part adhered to inner surfaces of said cells of said honeycomb and comprising Ir catalyst; and a second layered catalyst part covering said first catalyst part and comprising a perovskite type composite oxide, wherein said perovskite type composite oxide comprises $LaCoO_3$.

* * * * *